United States Patent
Liu et al.

(10) Patent No.: US 10,813,138 B2
(45) Date of Patent: Oct. 20, 2020

(54) METHODS AND DEVICES FOR IMPROVING RANDOM ACCESS RESPONSE (RAR) TRANSMISSION BANDWIDTH EFFICIENCY

(71) Applicant: Telefonaktiebolaget LM Ericsson (publ), Stockholm (SE)

(72) Inventors: Jinhua Liu, Beijing (CN); Jan Christoffersson, Luleå (SE); Mats Folke, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 16/309,799

(22) PCT Filed: Jun. 8, 2018

(86) PCT No.: PCT/CN2018/090448
§ 371 (c)(1),
(2) Date: Dec. 13, 2018

(87) PCT Pub. No.: WO2019/029251
PCT Pub. Date: Feb. 14, 2019

(65) Prior Publication Data
US 2020/0077444 A1    Mar. 5, 2020

(30) Foreign Application Priority Data

Aug. 11, 2017   (WO) ................ PCT/CN2017/097199

(51) Int. Cl.
*H04W 74/08*    (2009.01)
*H04L 5/00*     (2006.01)
(Continued)

(52) U.S. Cl.
CPC ....... *H04W 74/0833* (2013.01); *H04L 5/0053* (2013.01); *H04W 74/006* (2013.01); *H04W 80/02* (2013.01)

(58) Field of Classification Search
CPC ........... H04W 74/0833; H04W 74/006; H04W 80/02; H04L 5/0053
See application file for complete search history.

(56) References Cited

U.S. PATENT DOCUMENTS

2015/0282214 A1* 10/2015 Lee .................... H04W 74/085
                                                    370/329
2015/0312798 A1   10/2015 Rune
2017/0195464 A1*  7/2017 Lee .................... H04L 69/324

FOREIGN PATENT DOCUMENTS

CN      102438306 A    5/2012
RU      2499364 C2    11/2013
(Continued)

OTHER PUBLICATIONS

Agiwal Anil, "System and Method of Identifying Random Access Response", Jul. 19, 2017, India, pp. 2-28 (Year: 2017).*

(Continued)

*Primary Examiner* — Ian N Moore
*Assistant Examiner* — Latresa A McCallum
(74) *Attorney, Agent, or Firm* — Withrow & Terranova, PLLC

(57) ABSTRACT

Methods and devices for improving Random Access Response (RAR) transmission bandwidth efficiency are disclosed herein. In this regard, a method includes receiving a random access request message from a terminal device, and transmitting to the terminal device an RAR message in response to the random access request message. The RAR message has a format dependent on a type of the random access request message.

10 Claims, 6 Drawing Sheets

(51) Int. Cl.
*H04W 74/00* (2009.01)
*H04W 80/02* (2009.01)

(56) References Cited

FOREIGN PATENT DOCUMENTS

| WO | 2010016726 | A2 | 2/2010 |
| WO | 2018226026 | A1 | 12/2018 |

OTHER PUBLICATIONS

Author Unknown, "Technical Specification Group Radio Access Network; Evolved Universal Terrestrial Radio Access (E-UTRA); Medium Access Control (MAC) protocol specification (Release 14)," Technical Specification 36.321, Version 14.2.0, 3GPP Organizational Partners, Mar. 2017, 106 pages.

Lenovo et al., "R2-1707090: Summary of [98#34][NR] on demand SI (Lenovo)," Third Generation Partnership Project (3GPP), TSG-RAN WG2 NR AdHoc, Jun. 27-29, 2017, 35 pages, Qingdao, China.

International Search Report and Written Opinion for International Patent Application No. PCT/CN2018/090448, dated Sep. 10, 2018, 9 pages.

NTT DoCoMo, Inc. et al., "R2-080451: RA response format," 3GPP TSG RAN WG2 #60bis, Jan. 14-18, 2008, Sevilla, Spain, 2 pages.

Extended European Search Report for European Patent Application No. 18800463.4, dated Sep. 24, 2019, 10 pages.

International Preliminary Report on Patentability for International Patent Application No. PCT/CN2018/090448, dated Nov. 29, 2019, 17 pages.

Decision to Grant for Russian Patent Application No. 2020109383, dated Aug. 10, 2020, 22 pages.

Examination Report for European Patent Application No. 18800463.4, dated Jun. 8, 2020, 7 pages.

\* cited by examiner

METHODS AND DEVICES FOR IMPROVING RANDOM ACCESS RESPONSE (RAR) TRANSMISSION BANDWIDTH EFFICIENCY

This application is a 35 U.S.C. § 371 national phase filing of International Application No. PCT/CN2018/090448, filed Jun. 8, 2018, which claims the benefit of International Application No. PCT/CN2017/097199, filed Aug. 11, 2017, the disclosures of which are incorporated herein by reference in their entireties.

TECHNICAL FIELD

The present disclosure relates to communication technology, and more particularly, to a network device, a terminal device and associated methods.

BACKGROUND

In a random access procedure in Long Term Evolution (LTE), a User Equipment (UE) transmits a random access request message, also known as Msg1, to an evolved NodeB (eNB) over Physical Random Access Channel (PRACH). In response, the eNB transmits a Random Access Response (RAR) message, also known as Msg2, to the UE over Physical Downlink Shared Channel (PDSCH).

The RAR message contains a header and an RAR Service Data Unit (SDU). In LTE, a number of RAR messages for different UEs can be multiplexed in a Medium Access Control (MAC) Protocol Data Unit (PDU). The header of each RAR message is referred to as a MAC sub-header as a number of such sub-headers are aggregated and placed in a MAC header at the beginning of the MAC PDU.

FIG. 1 shows a format of the MAC sub-header as specified in the $3^{rd}$ Generation Partnership Project (3GPP) Technical Specification (TS) 36.321-e20, which is incorporated here in its entirety by reference. As shown in FIG. 1, the MAC sub-header has a size of one octet and contains an extension (E) field (1-bit) indicating whether there will be more MAC sub-headers present in the MAC header, a type (T) field (1-bit) indicating whether the MAC sub-header contains a Random Access Preamble Identifier (RAPID) or a Back-off Indicator (BI) (RAPID in this case), and a RAPID field (6-bit).

FIG. 2 shows another format of the MAC sub-header as specified in 3GPP TS 36.321-e20. The MAC sub-header contains the same E field and T field as those shown in FIG. 1, with the T field indicating a presence of BI in this case. The MAC sub-header further contains two reserved bits (R) and a BI field (4-bit) instead of RAPID field.

FIG. 3 shows a format of the RAR SDU as specified in 3GPP TS 36.321-e20. As shown, the RAR SDU has a size of six octets and contains a reserved bit (R), a Timing Advance (TA) command field (11-bit) carrying a TA command for uplink synchronization, an uplink (UL) grant field (20-bit) carrying a UL grant for Msg3 transmission, and a temporary Cell-Radio Network Temporary Identifier (C-RNTI) field (16-bit) carrying an RNTI that is temporarily used during the random access procedure.

FIG. 4 shows an example of a MAC PDU consisting of a MAC header and MAC RARs. As shown, n MAC RARs (hereafter, referred to as RAR messages) are multiplexed in a payload of a MAC PDU. The MAC header contains n MAC sub-headers.

In LTE, the RAR SDU has a fixed format and thus a fixed size, as all the fields shown in FIG. 3 are always included. This may be sub-optimal from the perspective of bandwidth efficiency, especially when the RAR message is transmitted assuming a minimum bandwidth capability of a UE.

There is thus a need for an improved solution for RAR design.

SUMMARY

It is an object of the present disclosure to provide a network device, a terminal device and associated methods, capable of achieving higher bandwidth efficiency with respect to RAR transmission.

According to a first aspect of the present disclosure, a method in a network device is provided. The method comprises: receiving a random access request message from a terminal device; and transmitting to the terminal device a Random Access Response (RAR) message in response to the random access request message. The RAR message has a format dependent on a type of the random access request.

In an embodiment, the RAR message can have a format only including a Medium Access Control (MAC) sub-header when the random access request message is a System Information (SI) request.

In an embodiment, the MAC sub-header can contain a Random Access Preamble Identifier (RAPID).

In an embodiment, the MAC sub-header can contain a type indicator indicating absence of RAR Service Data Unit (SDU).

In an embodiment, the RAR message can include no RAR SDU when the MAC sub-header includes a Back-off Indicator (BI). When the type indicator indicates the absence of an RAR SDU, the MAC sub-header can further contain an SI/BI indicator indicating whether the MAC sub-header serves as an acknowledgement responsive to an SI request or as a BI.

In an embodiment, the RAR message can include an RAR SDU. The RAR SDU can have a first format including a Timing Advance (TA) command field, an uplink (UL) grant field, and a temporary Cell-Radio Network Temporary Identifier (C-RNTI) field when the random access request message is for initial access. The RAR SDU can have a second format including the TA command field when the random access request message is for intra-cell beam switch or contention-free access for a secondary carrier in a Carrier Aggregation (CA) configuration. The RAR SDU can have a third format including the TA command field and the UL grant field when the random access request message is for contention-free handover.

In an embodiment, the MAC sub-header can contain a type indicator indicating the format of the RAR SDU.

In an embodiment, the MAC sub-header can contain a bitmap. Each bit in the bitmap can indicate presence or absence of the TA command field, the UL grant field, or the temporary C-RNTI field in the RAR SDU.

In an embodiment, the RAR SDU can further include a reserved bit redefined to indicate presence or absence of the TA command field, the UL grant field, or the temporary C-RNTI field in the RAR SDU.

According to a second aspect of the present disclosure, a network device is provided. The network device comprises a transceiver, a processor and a memory.

The memory comprises instructions executable by the processor whereby the network device is operative to perform the method according to above first aspect.

According to a third aspect of the present disclosure, a computer readable storage medium is provided. The computer readable storage medium has computer program instructions stored thereon. The computer program instructions, when executed by a processor in a network device, cause the network device to perform the method according to above first aspect.

According to a fourth aspect of the present disclosure, a method in a terminal device is provided. The method comprises: transmitting a random access request message to a network device; and receiving from the network device a Random Access Response (RAR) message responsive to the random access request message. The RAR message has a format dependent on a type of the random access request.

In an embodiment, the RAR message can have a format only including a Medium Access Control (MAC) sub-header when the random access request message is a System Information (SI) request.

In an embodiment, the MAC sub-header can contain a Random Access Preamble Identifier (RAPID).

In an embodiment, the MAC sub-header can contain a type indicator indicating absence of RAR Service Data Unit (SDU).

In an embodiment, the RAR message can include no RAR SDU when the MAC sub-header includes a Back-off Indicator (BI). When the type indicator indicates the absence of an RAR SDU, the MAC sub-header can further contain an SI/BI indicator indicating whether the MAC sub-header serves as an acknowledgement responsive to an SI request or as a BI.

In an embodiment, the RAR message can include an RAR SDU. The RAR SDU can have a first format including a Timing Advance (TA) command field, an uplink (UL) grant field, and a temporary Cell-Radio Network Temporary Identifier (C-RNTI) field when the random access request message is for initial access. The RAR SDU can have a second format including the TA command field when the random access request message is for intra-cell beam switch or contention-free access for a secondary carrier in a Carrier Aggregation (CA) configuration. The RAR SDU can have a third format including the TA command field and the UL grant field when the random access request message is for contention-free handover.

In an embodiment, the MAC sub-header can contain a type indicator indicating the format of the RAR SDU.

In an embodiment, the MAC sub-header can contain a bitmap. Each bit in the bitmap can indicate presence or absence of the TA command field, the UL grant field, or the temporary C-RNTI field in the RAR SDU.

In an embodiment, the RAR SDU can further include a reserved bit redefined to indicate presence or absence of the TA command field, the UL grant field, or the temporary C-RNTI field in the RAR SDU.

According to a fifth aspect of the present disclosure, a terminal device is provided.

The terminal device comprises a transceiver, a processor and a memory. The memory comprises instructions executable by the processor whereby the terminal device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a terminal device, cause the terminal device to perform the method according to the above fourth aspect.

With the embodiments of the present disclosure, a variable format of the RAR message can be provided, depending on the type of the corresponding random access request message. The variable format allows omitting unnecessary fields in certain circumstances. In this way, the signaling overhead of the RAR message can be reduced and the bandwidth efficiency with respect to RAR transmission can be improved.

BRIEF DESCRIPTION OF THE DRAWINGS

The above and other objects, features and advantages will be more apparent from the following description of embodiments with reference to the figures, in which.

DETAILED DESCRIPTION

Figure 1:
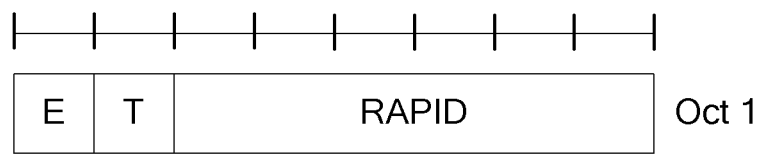
FIG. 1 is a schematic diagram showing a format of a header of an RAR message in LTE.
Figure 2:
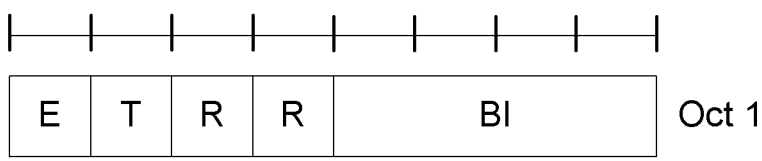
FIG. 2 is a schematic diagram showing another format of a header of an RAR message in LTE.

The embodiments of the disclosure will be detailed below with reference to the drawings. It should be appreciated that the following embodiments are illustrative only, rather than limiting the scope of the disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 3:
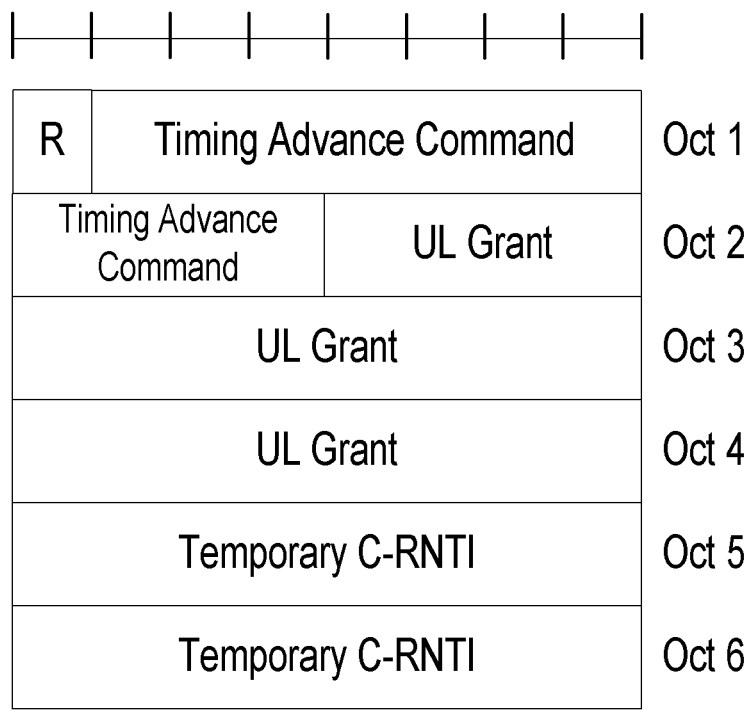
FIG. 3 is a schematic diagram showing a format of an RAR SDU in LTE.
Figure 4:
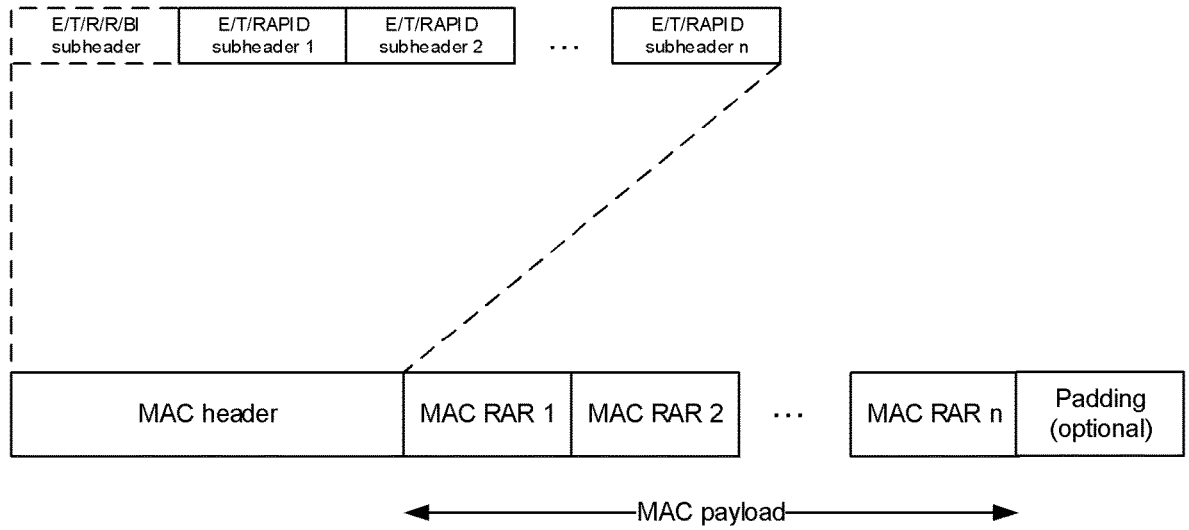
FIG. 4 is a schematic diagram showing an example of a MAC PDU consisting of a MAC header and MAC RARs.

The inventors have realized that not all of the fields shown in FIG. 3 are necessary in some circumstances. For example, in LTE, all the fields shown in FIG. 3 are necessary to be included in the RAR SDU only when the corresponding random access request message is for initial access of a UE. When the random access request message is for intra-cell beam switch or contention-free access for a secondary carrier in a Carrier Aggregation (CA) configuration, only the TA command field is mandatory and the UL grant field and the temporary C-RNTI field are not required in most cases.

When the random access request message is for contention-free handover, only the TA command field and the UL grant field are mandatory and the temporary C-RNTI field is not required if the UE's C-RNTI does not need to be reconfigured. Moreover, in New Radio (NR), it has been agreed to reuse the random access request message as a request for System Information (SI) referred to as "additional SI" or "other SI" as opposed to "minimum SI". In this case, the RAR message can serve as an acknowledgement of the SI request and none of the fields shown in FIG. 3 is needed.

Figure 5:
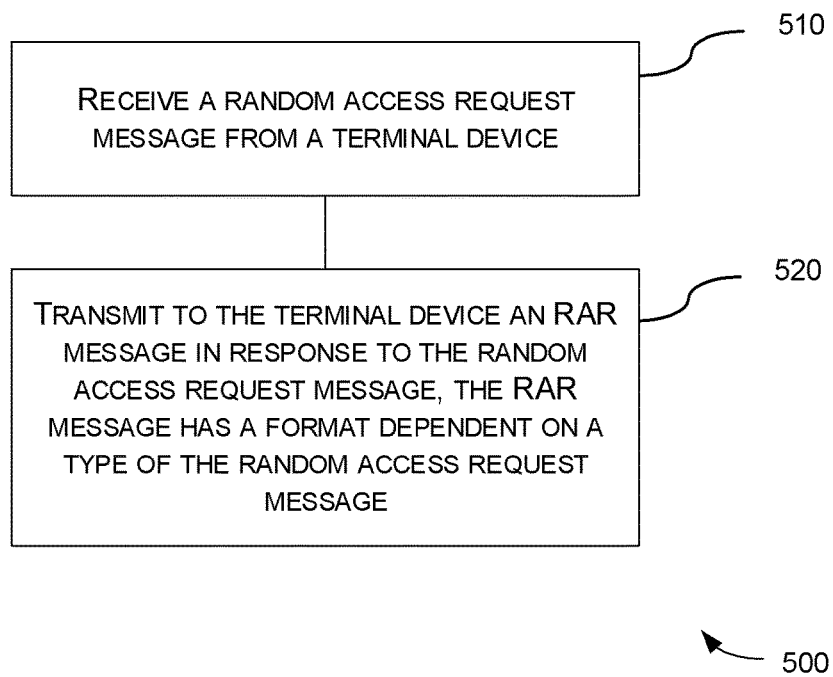
FIG. 5 is a flowchart illustrating a method in a network device according to an embodiment of the present disclosure.

FIG. 5 is a flowchart illustrating a method 500 according to an embodiment of the present disclosure. The method 500 can be performed at a network device.

At block 510, a random access request message is received from a terminal device. The random access request message can be e.g., Msg1 over PRACH, as described above.

At block 520, a Random Access Response (RAR) message is transmitted to the terminal device in response to the random access request message. The RAR message (i.e. RAR) has a format dependent on a type of the random access request message. The RAR message can include a header (e.g., MAC sub-header as described above) and an RAR Service Data Unit (SDU).

Alternatively, the RAR message can include a header but no RAR SDU.

The term "format" as used herein refers to a composition of the RAR message with respect to fields included in the header and/or the RAR SDU.

Here, the network device can determine the type of the random access request message based on a RAPID of the random access preamble contained in the random access request message. For example, different ranges of RAPIDs can be assigned to different types, or purposes, of the random access request messages, respectively. In the context of the present disclosure, the types or purposes, of the random access request messages include, but not limited to: initial access; intra-cell beam switch; contention-free access for a secondary carrier in a CA configuration; contention-free handover; and SI request.

In an example, the RAR message can have a format only including a MAC sub-header, i.e., no RAR SDU, when the random access request message is an SI request. In this case, the MAC sub-header may contain a type indicator indicating absence of RAR SDU. The MAC sub-header may contain a RAPID.

In another example, the RAR message includes an RAR SDU. The RAR SDU has a first format including a TA command field, a UL grant field, and a temporary C-RNTI field when the random access request message is for initial access. Alternatively, the RAR SDU has a second format including the TA command field when the random access request message is for intra-cell beam switch or contention-free access for a secondary carrier in a CA configuration. Alternatively, the RAR SDU has a third format including the TA command field and the UL grant field when the random access request message is for contention-free handover.

In this case, the header can contain a type indicator indicating the format of the RAR SDU.

Figure 6:
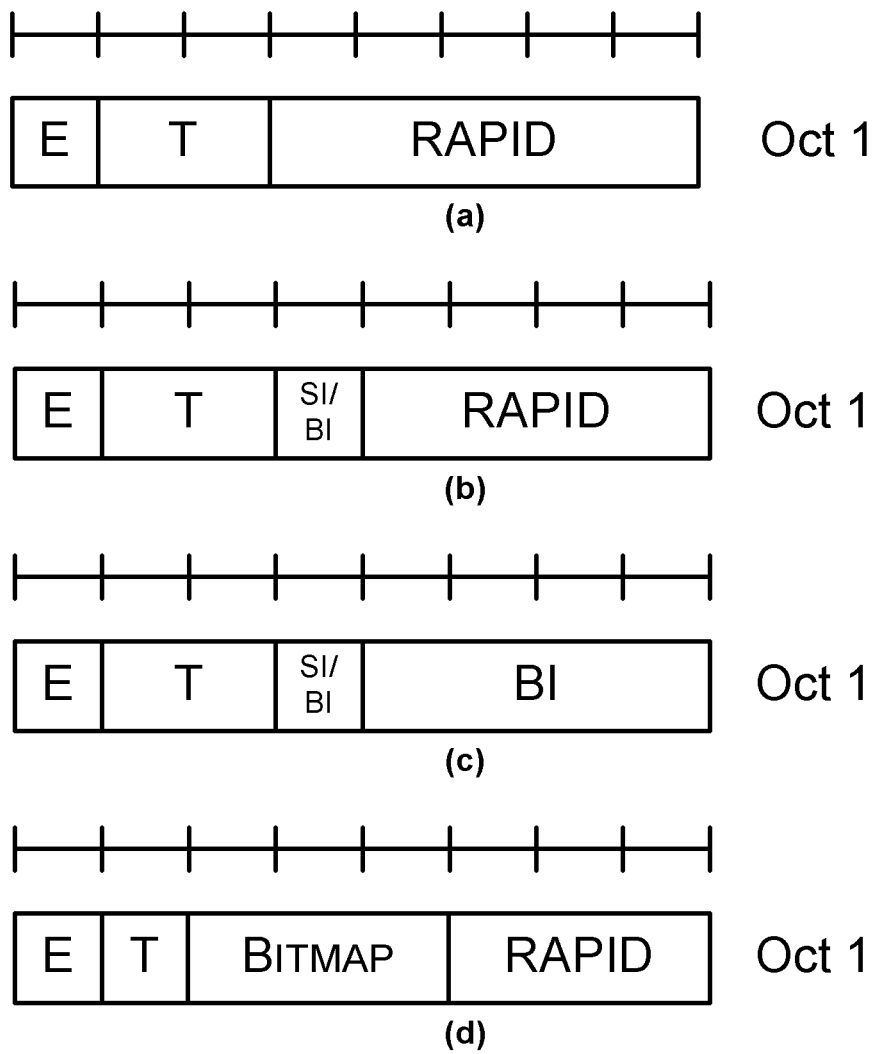
FIG. 6 is a schematic diagram showing exemplary formats of headers of RAR messages according to an embodiment of the present disclosure.

FIG. 6 is a schematic diagram showing exemplary formats of headers of RAR messages according to an embodiment of the present disclosure. In FIG. 6(a), a 2-bit type (T) field is provided. Compared with the header format shown in FIG. 1, the header format in FIG. 6(a) has one more bit for the T field and one less for the RAPID field. In other words, the T field shown in FIG. 1 can be extended, such that different values of the T field can indicate different formats of RAR SDU, or absence of RAR SDU, as shown in Table 1 below.

TABLE 1

Exemplary Values of T Field

| T Field | Field(s) included in RAR SDU | Type of Random Access Request |
| --- | --- | --- |
| 00 | TA Command, UL Grant, Temporary C-RNTI | Initial Access |
| 01 | None (no RAR SDU) | SI Request |
| 10 | TA Command | Intra-cell Beam Switch, Contention-free Access for Secondary Carrier |
| 11 | TA Command, UL Grant | Contention-free Handover |

In an example, when the header may include a Back-off Indicator (BI), the RAR message may not include RAR SDU. In this case, when the type indicator indicates the absence of the RAR SDU (e.g., T=01 in Table 1), the header may further contain an SI/BI indicator indicating whether the header serves as an acknowledgement responsive to an SI request or as a BI. This is shown in FIG. 6(b) and FIG. 6(c). In FIG. 6(b), the header contains a 2-bit T field, a 1-bit SI/BI field (indicating SI in this case with e.g., a value of "0") and a 4-bit field containing a truncated RAPID or reserved bits. In FIG. 6(c), the header contains a 2-bit T field, a 1-bit SI/BI field (indicating BI in this case with e.g., a value of "1") and a 4-bit BI field.

In an example, the header may further contain a portion of a RAPID and the RAR SDU further includes the remaining portion of the RAPID. For example, in the header shown in FIG. 6(a), the RAPID field contains 5 out of 6 bits of the RAPID. In this case, the remaining 1 bit (which can be e.g., one Most Significant Bit (MSB)) can be included in the RAR SDU (assuming 6-bit RAPID). For example, a reserved bit (e.g., the R bit shown in FIG. 3) in the RAR SDU can be redefined to represent the remaining 1 bit of the RAPID. Alternatively, the header may not contain the RAPID and the RAR SDU may further include the RAPID.

As an alternative to the above extension of the T field, the header may contain a bitmap, with each bit in the bitmap indicating presence or absence of the TA command field, the UL grant field, or the temporary C-RNTI field in the RAR SDU. This is shown in FIG. 6(d). In FIG. 6(d) the header contains a bitmap of 3 bits representing the presence or absence of the TA command field, the UL grant field, or the temporary C-RNTI field in the RAR SDU, respectively. For example, each bit in the bitmap having a value of "1" indicates the presence of the corresponding field or a value of "0" indicates the absence of the corresponding field. As an example, a bitmap of "100" indicates that the RAR SDU contains a TA command field, but no UL grant field or temporary C-RNTI field. As shown in FIG. 6(d), there are only 3 bits for the RAPID field and the remaining 3 bits of the RAPID can be included in the RAR SDU (assuming 6-bit RAPID).

As another alternative to the above extension of the T field, the RAR SDU may further include a reserved bit (e.g., the R bit shown in FIG. 3) redefined to indicate presence or absence of the TA command field, the UL grant field, or the temporary C-RNTI field in the RAR SDU. This requires a minimum modification to the format of the RAR message in LTE.

Figure 7:
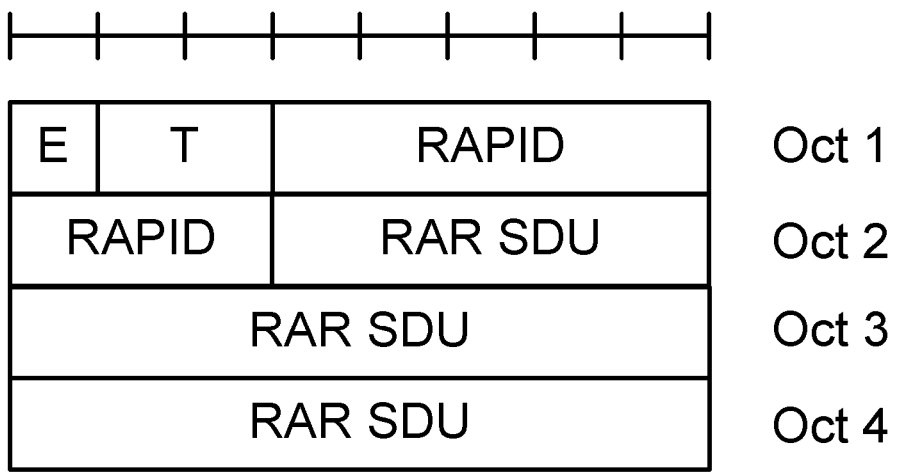
FIG. 7 is a schematic diagram showing an exemplary format of an RAR message that is not octet-aligned according to an embodiment of the present disclosure.

Here, as can be seen from FIG. 6(a)~(d), the header and the RAR SDU is octet-aligned, as in LTE. Alternatively, the header and/or the RAR SDU may not be octet-aligned. FIG. 7 is a schematic diagram showing an exemplary format of an RAR message that is not octet-aligned according to an embodiment of the present disclosure. In this example, assuming an 8-bit RAPID, the header has a size of 11 bits, which is not octet-aligned. The RAR SDU is not octet-aligned either. The size of the RAR SDU in FIG. 7 is illustrative only and it may include more or less bits in other examples.

Figure 8:
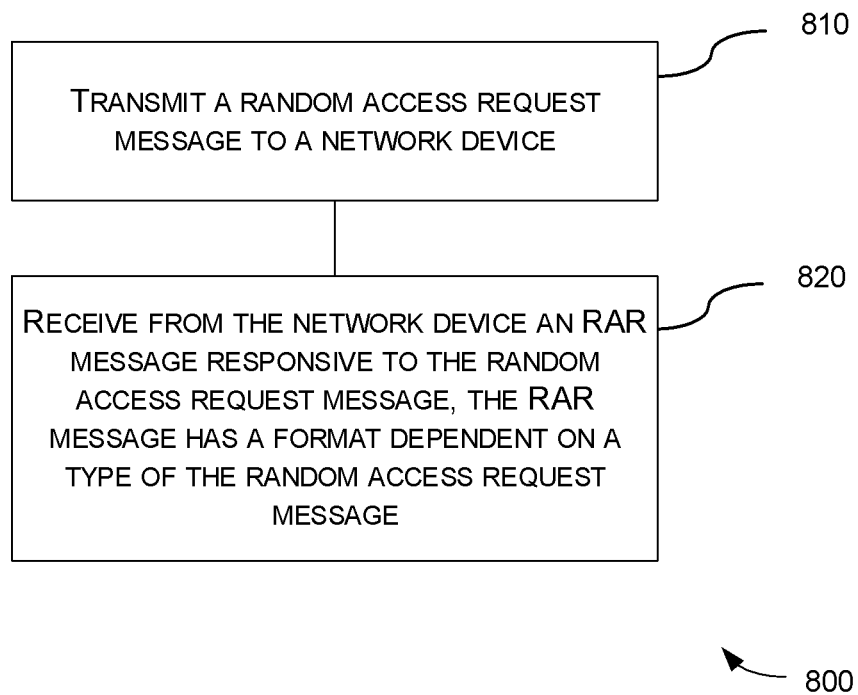
FIG. 8 is a flowchart illustrating a method in a terminal device according to another embodiment of the present disclosure.

FIG. 8 is a flowchart illustrating a method 800 according to an embodiment of the present disclosure. The method 800 can be performed at a terminal device.

At block 810, a random access request message is transmitted to a network device. The random access request message can be e.g., Msg1 over PRACH, as described above.

At block 820, a Random Access Response (RAR) message responsive to the random access request message is received from the network device. The RAR message has a format dependent on a type of the random access request message. The RAR message can include a header (e.g., MAC sub-header as described above) and an RAR Service Data Unit (SDU). Alternatively, the RAR message can include a header but no RAR SDU.

In an example, the RAR message can have a format only including a MAC sub-header, i.e., no RAR SDU, when the random access request message is an SI request. In this case, the MAC sub-header may contain a type indicator indicating absence of RAR SDU. The MAC sub-header may contain a RAPID.

In another example, the RAR message includes an RAR SDU. The RAR SDU has a first format including a TA command field, a UL grant field, and a temporary C-RNTI field when the random access request message is for initial access. Alternatively, the RAR SDU has a second format including the TA command field when the random access request message is for intra-cell beam switch or contention-free access for a secondary carrier in a CA configuration. Alternatively, the RAR SDU has a third format including the TA command field and the UL grant field when the random access request message is for contention-free handover.

In this case, the header can contain a type indicator indicating the format of the RAR SDU, as shown in FIG. 6(a)~(c).

In an example, when the header includes a Back-off Indicator (BI), the RAR message does not include RAR SDU. In this case, as shown in FIGS. 6(b) and (c), when the type indicator indicates the absence of the RAR SDU, the header may further contain an SI/BI indicator indicating whether the header serves as an acknowledgement responsive to an SI request or as a BI.

In an example, as shown in FIG. 6(d), the header may contain a bitmap, each bit in the bitmap indicating presence or absence of the TA command field, the UL grant field, or the temporary C-RNTI field in the RAR SDU.

In an example, the RAR SDU may further include a reserved bit (e.g., the R bit shown in FIG. 3) redefined to indicate presence or absence of the TA command field, the UL grant field, or the temporary C-RNTI field in the RAR SDU.

In an example, the header and/or the RAR SDU may or may not be octet-aligned, as shown in FIGS. 6 and 7.

It is to be noted here that the examples described above in connection with FIGS. 5, 6(a)~(d) and 7 also apply to the method 800.

Figure 9:
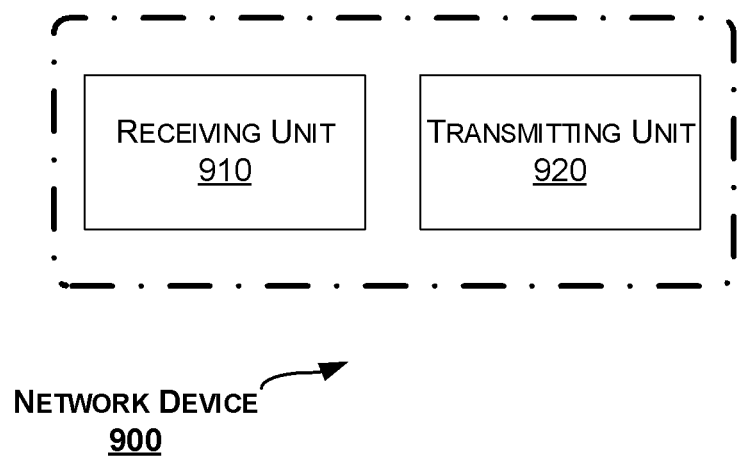
FIG. 9 is a block diagram of a network device according to an embodiment of the present disclosure.

Correspondingly to the method 500 as described above, a network device is provided. FIG. 9 is a block diagram of a network device 900 according to an embodiment of the present disclosure.

As shown in FIG. 9, the network device 900 includes a receiving unit 910 configured to receive a random access request message from a terminal device. The network device 900 further includes a transmitting unit 920 configured to transmit to the terminal device a Random Access Response (RAR) message in response to the random access request message. The RAR message has a format dependent on a type of the random access request.

In an embodiment, the RAR message can have a format only including a Medium Access Control (MAC) sub-header when the random access request message is a System Information (SI) request.

In an embodiment, the MAC sub-header can contain a Random Access Preamble Identifier (RAPID).

In an embodiment, the MAC sub-header can contain a type indicator indicating absence of RAR Service Data Unit (SDU).

In an embodiment, the RAR message can include no RAR SDU when the MAC sub-header includes a Back-off Indicator (BI). When the type indicator indicates the absence of an RAR SDU, the MAC sub-header can further contain an SI/BI indicator indicating whether the MAC sub-header serves as an acknowledgement responsive to an SI request or as a BI.

In an embodiment, the RAR message can include an RAR SDU. The RAR SDU can have a first format including a Timing Advance (TA) command field, an uplink (UL) grant field, and a temporary Cell-Radio Network Temporary Identifier (C-RNTI) field when the random access request message is for initial access. The RAR SDU can have a second format including the TA command field when the random access request message is for intra-cell beam switch or contention-free access for a secondary carrier in a Carrier Aggregation (CA) configuration. The RAR SDU can have a third format including the TA command field and the UL grant field when the random access request message is for contention-free handover.

In an embodiment, the MAC sub-header can contain a type indicator indicating the format of the RAR SDU.

In an embodiment, the MAC sub-header can contain a bitmap. Each bit in the bitmap can indicate presence or absence of the TA command field, the UL grant field, or the temporary C-RNTI field in the RAR SDU.

In an embodiment, the RAR SDU can further include a reserved bit redefined to indicate presence or absence of the TA command field, the UL grant field, or the temporary C-RNTI field in the RAR SDU.

The receiving unit 910 and the transmitting unit 920 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 5.

Figure 10:
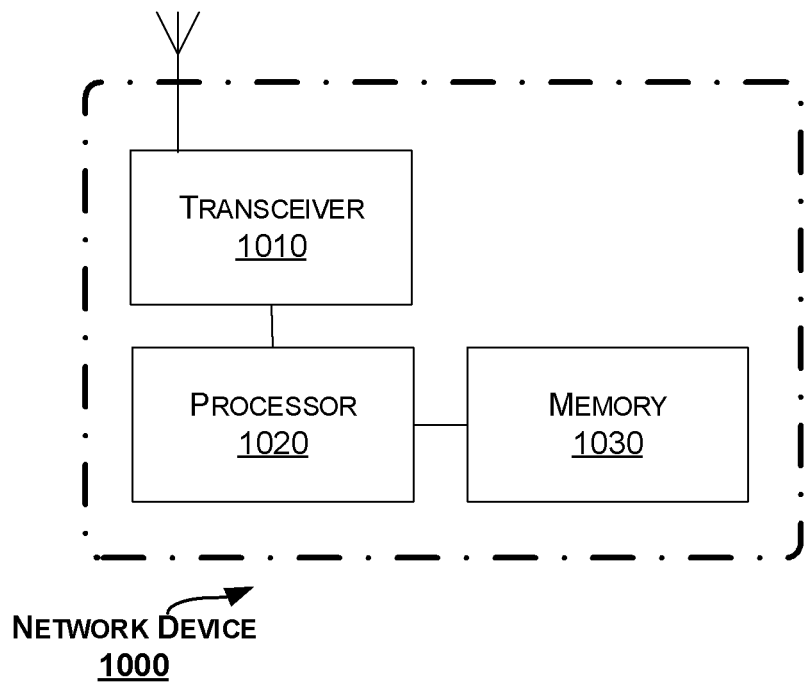
FIG. 10 is a block diagram of a network device according to another embodiment of the present disclosure.

FIG. 10 is a block diagram of a network device 1000 according to another embodiment of the present disclosure.

The network device 1000 includes a transceiver 1010, a processor 1020 and a memory 1030. The memory 1030 contains instructions executable by the processor 1020 whereby the network device 1000 is operative to perform the actions, e.g., of the procedure described earlier in conjunction with FIG. 5. Particularly, the memory 1030 contains instructions executable by the processor 1020 whereby the network device 1000 is operative to receive a random access request message from a terminal device; and transmit to the terminal device a Random Access Response, RAR, message in response to the random access request message. The RAR message has a format dependent on a type of the random access request message.

In an embodiment, the RAR message can have a format only including a Medium Access Control (MAC) sub-header when the random access request message is a System Information (SI) request.

In an embodiment, the MAC sub-header can contain a Random Access Preamble Identifier (RAPID).

In an embodiment, the MAC sub-header can contain a type indicator indicating absence of RAR Service Data Unit (SDU).

In an embodiment, the RAR message can include no RAR SDU when the MAC sub-header includes a Back-off Indicator (BI). When the type indicator indicates the absence of an RAR SDU, the MAC sub-header can further contain an SI/BI indicator indicating whether the MAC sub-header serves as an acknowledgement responsive to an SI request or as a BI.

In an embodiment, the RAR message can include an RAR SDU. The RAR SDU can have a first format including a Timing Advance (TA) command field, an uplink (UL) grant field, and a temporary Cell-Radio Network Temporary Identifier (C-RNTI) field when the random access request message is for initial access. The RAR SDU can have a second format including the TA command field when the random access request message is for intra-cell beam switch or contention-free access for a secondary carrier in a Carrier Aggregation (CA) configuration. The RAR SDU can have a third format including the TA command field and the UL grant field when the random access request message is for contention-free handover.

In an embodiment, the MAC sub-header can contain a type indicator indicating the format of the RAR SDU.

In an embodiment, the MAC sub-header can contain a bitmap. Each bit in the bitmap can indicate presence or absence of the TA command field, the UL grant field, or the temporary C-RNTI field in the RAR SDU.

In an embodiment, the RAR SDU can further include a reserved bit redefined to indicate presence or absence of the TA command field, the UL grant field, or the temporary C-RNTI field in the RAR SDU.

Figure 11:
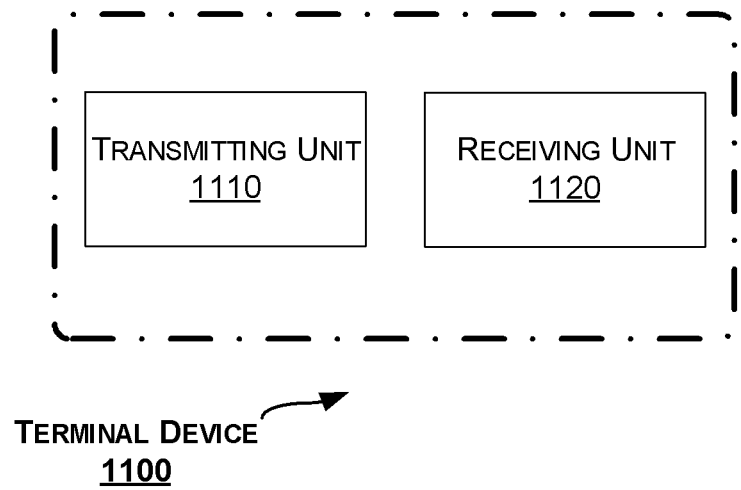
FIG. 11 is a block diagram of a terminal device according to an embodiment of the present disclosure.

Correspondingly to the method 800 as described above, a terminal device is provided. FIG. 11 is a block diagram of a terminal device 1100 according to an embodiment of the present disclosure.

As shown in FIG. 11, the terminal device 1100 includes a transmitting unit 1110 configured to transmit a random access request message to a network device. The terminal device 1100 further includes a receiving unit 1120 configured to receive from the network device a Random Access Response (RAR) message responsive to the random access request message. The RAR message has a format dependent on a type of the random access request.

In an embodiment, the RAR message can have a format only including a Medium Access Control (MAC) sub-header when the random access request message is a System Information (SI) request.

In an embodiment, the MAC sub-header can contain a Random Access Preamble Identifier (RAPID).

In an embodiment, the MAC sub-header can contain a type indicator indicating absence of RAR Service Data Unit (SDU).

In an embodiment, the RAR message can include no RAR SDU when the MAC sub-header includes a Back-off Indicator (BI). When the type indicator indicates the absence of an RAR SDU, the MAC sub-header can further contain an SI/BI indicator indicating whether the MAC sub-header serves as an acknowledgement responsive to an SI request or as a BI.

In an embodiment, the RAR message can include an RAR SDU. The RAR SDU can have a first format including a Timing Advance (TA) command field, an uplink (UL) grant field, and a temporary Cell-Radio Network Temporary Identifier (C-RNTI) field when the random access request message is for initial access. The RAR SDU can have a second format including the TA command field when the random access request message is for intra-cell beam switch or contention-free access for a secondary carrier in a Carrier Aggregation (CA) configuration. The RAR SDU can have a third format including the TA command field and the UL grant field when the random access request message is for contention-free handover.

In an embodiment, the MAC sub-header can contain a type indicator indicating the format of the RAR SDU.

In an embodiment, the MAC sub-header can contain a bitmap. Each bit in the bitmap can indicate presence or absence of the TA command field, the UL grant field, or the temporary C-RNTI field in the RAR SDU.

In an embodiment, the RAR SDU can further include a reserved bit redefined to indicate presence or absence of the TA command field, the UL grant field, or the temporary C-RNTI field in the RAR SDU.

The transmitting unit 1110 and the receiving unit 1120 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 8.

Figure 12:
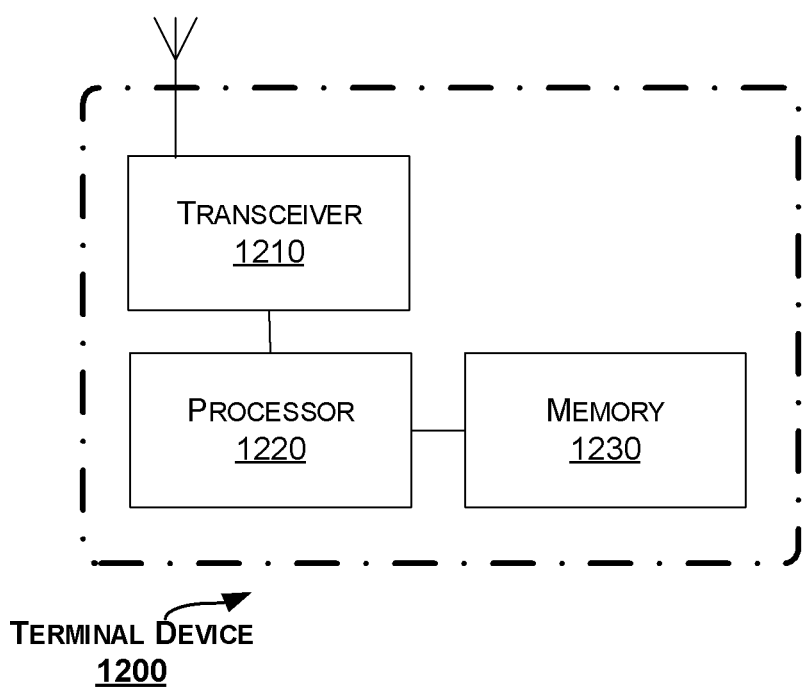
FIG. 12 is a block diagram of a terminal device according to another embodiment of the present disclosure.

FIG. 12 is a block diagram of a terminal device 1200 according to another embodiment of the present disclosure.

The terminal device 1200 includes a transceiver 1210, a processor 1220 and a memory 1230. The memory 1230 contains instructions executable by the processor 1220 whereby the terminal device 1200 is operative to perform the actions, e.g., of the procedure described earlier in conjunction with FIG. 8. Particularly, the memory 1230 contains instructions executable by the processor 1220 whereby the terminal device 1200 is operative to transmit a random access request message to a network device; and receive from the network device a Random Access Response (RAR) message responsive to the random access request message. The RAR message has a format dependent on a type of the random access request.

In an embodiment, the RAR message can have a format only including a Medium Access Control (MAC) sub-header when the random access request message is a System Information (SI) request.

In an embodiment, the MAC sub-header can contain a Random Access Preamble Identifier (RAPID).

In an embodiment, the MAC sub-header can contain a type indicator indicating absence of RAR Service Data Unit (SDU).

In an embodiment, the RAR message can include no RAR SDU when the MAC sub-header includes a Back-off Indicator (BI). When the type indicator indicates the absence of an RAR SDU, the MAC sub-header can further contain an SI/BI indicator indicating whether the MAC sub-header serves as an acknowledgement responsive to an SI request or as a BI.

In an embodiment, the RAR message can include an RAR SDU. The RAR SDU can have a first format including a Timing Advance (TA) command field, an uplink (UL) grant field, and a temporary Cell-Radio Network Temporary Identifier (C-RNTI) field when the random access request message is for initial access. The RAR SDU can have a second format including the TA command field when the random access request message is for intra-cell beam switch or contention-free access for a secondary carrier in a Carrier Aggregation (CA) configuration. The RAR SDU can have a third format including the TA command field and the UL grant field when the random access request message is for contention-free handover.

In an embodiment, the MAC sub-header can contain a type indicator indicating the format of the RAR SDU.

In an embodiment, the MAC sub-header can contain a bitmap. Each bit in the bitmap can indicate presence or absence of the TA command field, the UL grant field, or the temporary C-RNTI field in the RAR SDU.

In an embodiment, the RAR SDU can further include a reserved bit redefined to indicate presence or absence of the TA command field, the UL grant field, or the temporary C-RNTI field in the RAR SDU.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1020 causes the network device 1000 to perform the actions, e.g., of the procedure described earlier in conjunction with FIG. 5; or code/computer readable instructions, which when executed by the processor 1220 causes the terminal device 1200 to perform the actions, e.g., of the procedure described earlier in conjunction with FIG. 8.

The computer program product may be configured as a computer program code structured in computer program modules. The computer program modules could essentially perform the actions of the flow illustrated in FIG. 5 or 8.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device, comprising:
receiving a random access request message from a terminal device; and
transmitting to the terminal device a Random Access Response, RAR, message in response to the random access request message,
wherein:
the RAR message has a format dependent on a type of the random access request message;
the RAR message includes an RAR Service Data Unit, SDU;
the RAR SDU has a first format including a Timing Advance, TA, command field, an uplink, UL, grant field, and a temporary Cell-Radio Network Temporary Identifier, C-RNTI, field when the random access request message is for initial access;
the RAR SDU has a second format including the TA command field when the random access request message is for intra-cell beam switch or contention-free access for a secondary carrier in a Carrier Aggregation, CA, configuration, or
the RAR SDU has a third format including the TA command field and the UL grant field when the random access request message is for contention-free handover.

2. The method of claim 1, wherein the MAC sub-header contains a type indicator indicating the format of the RAR SDU.

3. The method of claim 1, wherein the MAC sub-header contains a bitmap, each bit in the bitmap indicating presence or absence of the TA command field, the UL grant field, or the temporary C-RNTI field in the RAR SDU.

4. The method of claim 1, wherein the RAR SDU further includes a reserved bit redefined to indicate presence or absence of the TA command field, the UL grant field, or the temporary C-RNTI field in the RAR SDU.

5. A method in a terminal device, comprising:
transmitting a random access request message to a network device; and
receiving from the network device a Random Access Response, RAR, message responsive to the random access request message,
wherein:
the RAR message has a format dependent on a type of the random access request message;
the RAR message includes an RAR Service Data Unit, SDU;
the RAR SDU has a first format including a Timing Advance, TA, command field, an uplink, UL, grant field, and a temporary Cell-Radio Network Temporary Identifier, C-RNTI, field when the random access request message is for initial access;
the RAR SDU has a second format including the TA command field when the random access request message is for intra-cell beam switch or contention-free access for a secondary carrier in a Carrier Aggregation, CA, configuration, or
the RAR SDU has a third format including the TA command field and the UL grant field when the random access request message is for contention-free handover.

6. The method of claim 5, wherein the MAC sub-header contains a type indicator indicating the format of the RAR SDU.

7. The method of claim 5, wherein the MAC sub-header contains a bitmap, each bit in the bitmap indicating presence or absence of the TA command field, the UL grant field, or the temporary C-RNTI field in the RAR SDU.

8. The method of claim 5, wherein the RAR SDU further includes a reserved bit redefined to indicate presence or absence of the TA command field, the UL grant field, or the temporary C-RNTI field in the RAR SDU.

9. A network device, comprising: a transceiver, a processor associated with the transceiver, and a memory, the memory comprising instructions executable by the processor whereby the processor is operative to:

receive a random access request message from a terminal device; and transmit to the terminal device a Random Access Response, RAR, message in response to the random access request message, wherein:
the RAR message has a format dependent on a type of the random access request message;
the RAR message includes an RAR Service Data Unit, SDU;
the RAR SDU has a first format including a Timing Advance, TA, command field, an uplink, UL, grant field, and a temporary Cell-Radio Network Temporary Identifier, C-RNTI, field when the random access request message is for initial access;
the RAR SDU has a second format including the TA command field when the random access request message is for intra-cell beam switch or contention-free access for a secondary carrier in a Carrier Aggregation, CA, configuration, or
the RAR SDU has a third format including the TA command field and the UL grant field when the random access request message is for contention-free handover.

10. A terminal device, comprising: a transceiver, a processor associated with the transceiver, and a memory, the memory comprising instructions executable by the processor whereby the processor is operative to:

transmit a random access request message to a network device; and receive from the network device a Random Access Response, RAR, message responsive to the random access request message, wherein:
the RAR message has a format dependent on a type of the random access request message;
the RAR message includes an RAR Service Data Unit, SDU;
the RAR SDU has a first format including a Timing Advance, TA, command field, an uplink, UL, grant field, and a temporary Cell-Radio Network Temporary Identifier, C-RNTI, field when the random access request message is for initial access;
the RAR SDU has a second format including the TA command field when the random access request message is for intra-cell beam switch or contention-free access for a secondary carrier in a Carrier Aggregation, CA, configuration, or
the RAR SDU has a third format including the TA command field and the UL grant field when the random access request message is for contention-free handover.

* * * * *